US012742888B2

(12) United States Patent
Morales et al.

(10) Patent No.: US 12,742,888 B2
(45) Date of Patent: Sep. 22, 2026

(54) RADIO FREQUENCY RECEIVER FOR SIMULTANEOUSLY PROCESSING MULTIPLE TYPES OF SIGNALS FOR POSITIONING AND METHOD OF OPERATION

(71) Applicant: StarNav, LLC, Walnut, CA (US)

(72) Inventors: Joshua Morales, Colton, CA (US); Christian Ardito, Victorville, CA (US)

(*) Notice: Subject to any disclaimer, the term of this patent is extended or adjusted under 35 U.S.C. 154(b) by 0 days.

(21) Appl. No.: 17/553,787

(22) Filed: Dec. 16, 2021

(65) Prior Publication Data

US 2022/0299653 A1 Sep. 22, 2022

Related U.S. Application Data

(60) Provisional application No. 63/126,526, filed on Dec. 16, 2020.

(51) Int. Cl.
*H04B 1/04* (2006.01)
*G01S 19/23* (2010.01)
*H04B 1/38* (2015.01)

(52) U.S. Cl.
CPC ................ *G01S 19/23* (2013.01); *H04B 1/04* (2013.01); *H04B 2001/0416* (2013.01)

(58) Field of Classification Search
None
See application file for complete search history.

(56) References Cited

U.S. PATENT DOCUMENTS 6,898,235 B1 * 5/2005 Carlin .................... H04B 1/001 342/147
2005/0110550 A1 * 5/2005 Shi ......................... H03D 3/008 327/307
2007/0081578 A1 * 4/2007 Fudge .................. H04B 1/0003 375/130
2016/0061935 A1 * 3/2016 McCloskey ........... G01S 7/4008 342/82
2022/0252714 A1 * 8/2022 Kitamura ................ G01S 7/354

* cited by examiner

*Primary Examiner* — Pablo N Tran
(74) *Attorney, Agent, or Firm* — Andrew Morabito

(57) ABSTRACT

The present invention is a PNT system comprising: at least one antenna wherein each of the at least one antenna receives a frequency within a predetermined range; at least one band pass filter connected to each of the at least one antenna; at least one low noise amplifier connected to the at least one band pass filter; at least one oscillator connected to the at least one low noise amplifier; a local oscillator connected to the at least one low noise amplifier, wherein the local oscillator is used to change the frequency of the signal; a programmable gain amplifier connected to the local oscillator; a driver connected to the programmable gain amplifier; an analog to digital converter connected to the local oscillator; and a processor connected to the analog to digital converter.

15 Claims, 10 Drawing Sheets

RADIO FREQUENCY RECEIVER FOR SIMULTANEOUSLY PROCESSING MULTIPLE TYPES OF SIGNALS FOR POSITIONING AND METHOD OF OPERATION

CROSS-REFERENCE TO RELATED APPLICATIONS

This application is a continuation (and claims the benefit of priority under 35 USC 120) of U.S. application No. 63/126,526 filed Dec. 16, 2020. The disclosure of the prior applications is considered part of (and is incorporated by reference in) the disclosure of this application.

BACKGROUND

This disclosure relates generally to a Positioning, Navigation and Timing (PNT) solution, and more specifically to a method, computer program and computer system to convert frequency signals to be used to improve the PNT solutions.

Global Position System (GPS) is the state of the art for PNT. Virtually all modern vehicles and smart devices rely on GPS to operate properly. Unfortunately, GPS signals are highly vulnerable to signal jamming and spoofing. Besides that, GPS signals are easily blocked by foliage and buildings, making their signals unavailable.

Current solutions to provide a PNT solution in GPS/GNSS denial involve a series of steps and have become very complicated. These solutions include the use of pseudolite-type beacons that transmit ranging signals or the fusion of camera, lidar, and other sensors. These approaches have several issues. Pseudolite-type beacons typically use ultra-wideband signals, which suffer from significant propagation attenuation, requiring the deployment of beacons in dense layouts. These layouts can interfere with other operations. Even if these ranging beacons use lower frequency band signals, they still become blocked by the Earth if dismounted personnel traverse valleys or if vehicles move between buildings that block the signals. Camera and lidar-based solutions can be bulky, heavy, power-hungry, very expensive and are practically unusable at night, in dense fog, and rain.

Modern RFEs are responsible for manipulating RF signals into a format that can be sampled by an analog-to-digital converter. Typically, this involves a series of filters, amplifiers, and mixers. There exists a plethora of different architectures for doing this signal conditioning (heterodyne, zero-IF, zero second-IF, direct RF sampling, etc.) and they all come with unique benefits and challenges. This RFE receiver leverages a heterodyne/IF receiver architecture. Specifically, undersampling is used to capture the desired signals to alleviate the requirements of image filters at the RF frequency. Essentially, Nyquist theory dictates that if the analog bandwidth of a signal into a sampler is less than half the sampling rate, it can be captured and reconstructed. Many modern ADCs have analog passbands that support sampling of higher Nyquist zones.

Current solutions typically focus on a single signal type for communication purposes. Here, the goal is to use these signals for PNT, therefore a special RFE board has been designed to processes multiple signal types simultaneously to extract timing and frequency information from multiple transmitters. Current communication REFE solutions processing these signals have no need to process the other signal types. Current solutions processing these signal types individually do not need to deal with conflicting mixer, clock, and ADC requirements for multiple signal types. Current solutions that allow the processing of multiple types of signals simultaneously for PNT use a multi-channel USRP. USRPs are not optimized for any particular signal type.

Therefore, it is desired for a method, computer program, or computer system to be able to provide hardware and software that is simplified and accurate PNT solution through the use of various signals to be used in the PNT process.

SUMMARY

In a first embodiment, the present invention is a PNT measurement calculating device comprising: at least one frequency receiver, wherein each of the at least two frequency receivers is configured to receive a signal from an antenna; and at least one processor, wherein each of the frequency receivers are connected to one of the at least one processor.

In a second embodiment, the present invention is a PNT communication system comprising: at least one antenna wherein each of the at least one antenna receives a frequency within a predetermined range; at least one band pass filter connected to each of the at least one antenna; at least one low noise amplifier connected to the at least one band pass filter; at least one oscillator connected to the at least one low noise amplifier; a local oscillator connected to the at least one low noise amplifier, wherein the local oscillator is used to change the frequency of the signal; a programmable gain amplifier connected to the local oscillator; a driver connected to the programmable gain amplifier; an analog to digital converter connected to the local oscillator; and a processor connected to the analog to digital converter.

In a third embodiment, the present invention is a PNT sensor comprising: an electronic frequency conversion module configured to receive at least one signal and convert the analog signal to a digital format; and a processing unit connected to the electronic frequency conversion module, wherein a PNT measurement is calculated from the received at least one signal.

BRIEF DESCRIPTION OF THE DRAWINGS

Referring now to the drawings in which like reference numbers represent corresponding parts throughout.

DETAILED DESCRIPTION

Figure 1:
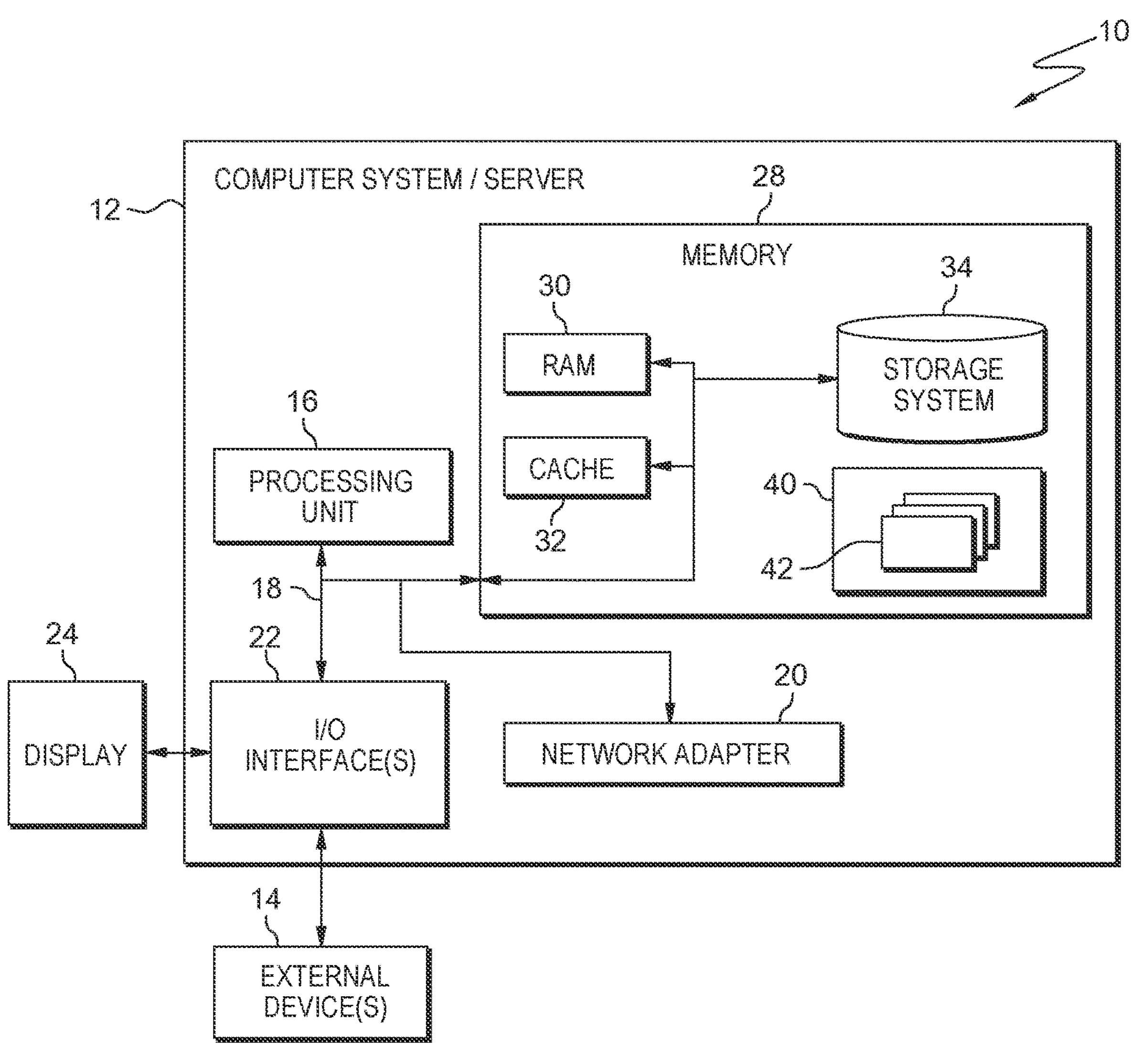
FIG. 1 depicts a computing node, according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "module", or "system." Furthermore, aspects of the present invention may take the form of a computer program product embodied in one or more computer readable medium(s) having computer readable program code/instructions embodied thereon.

The present invention provides hardware that incorporates proper band-pass anti-aliasing filters for each signal type that will be used for PNT to prevent unwanted signals from corrupting the sampling process, which would degrade PNT performance. Since multiple specific signal types are simultaneously being processed, components for each of the three steps corresponding to each signal type are used together in a single product versus multiple products. If multiple products were to be used instead of this single board design, each one would be driven by a clock which would be unsynchronized with each other in frequency and phase; an undesirable feature for PNT. The present hardware processes multiple signal types using stages driven by the same clock. A specific clock has been selected to work with each mixing stage assigned to each signal type and employs programmable gain amplifiers to allow for adjusting the power delivered into the ADC in a potentially contested environment (where bad actors try to tamper with GPS or other signals to degrade PNT performance).

The present invention proposes to convert ambient radio frequency (RF) signals that were never intended for PNT purposes into PNT-usable sources. These signals are known as signals of opportunity (SOPs). SOPs may be terrestrial transmitted: AM/FM radio, cellular, digital television or satellite transmitted: Low Earth Orbit (LEO) satellite signals. Since SOPs were never intended for PNT purposes, there are several technical challenges that must be addressed: unknown transmitter positions, unknown dynamic and stochastic clock errors, unavailability of SOP receivers that extract PNT measurements in the market, and unavailability of PNT algorithms that use SOP measurements.

These signals possess several desirable attributes for generating PNT in GPS/GNSS denial: Abundance; Cellular networks alone provide dozens of usable signals at most locations. Hundreds of communications, search and rescue, weather, and amateur LEO satellites are currently in orbit. Powerful; SOP carrier-to-noise ratio is commonly tens of dBs higher than that of GNSS signals. Geometric diversity: Fusing terrestrial signals at low elevations angles with satellite transmitted signals at high elevations angles produces low geometric dilution of precision (GDOP). Frequency range—Cellular and LEO satellite signals are scattered across frequency bands, making them collectively more resilient to jamming and spoofing. Free—Using special signal processing, PNT measurements are extracted from the signals without subscriptions to the service providers. The present invention develops special SOP receivers, which can extract pseudorange, Doppler and carrier phase PNT measurements from several transmitters without having network subscriptions.

Vehicular and handheld positioning system typically use a Global navigation satellite system (GNSS) receiver as the heart of their position, navigation, and timing (PNT) systems. GNSS includes several systems developed and maintained by different countries (e.g., Global Positioning System (GPS) by the United States, GLONASS by Russia, Galileo by European Union, etc.). Any of these systems suffer from the same problems: (i) attenuation in deep urban canyons or under canopies; (ii) unintentional or intentional signal interference, e.g., jamming; or (iii) spoofing (transmission of counterfeit signals to fool the receiver).

Research has demonstrated the use of signals of opportunity as a backup or supplement to GNSS signals to address these problems. Signals of opportunity are ambient radio frequency signals (e.g., cellular, television, and low Earth orbit satellite communication signals) that were never intended for PNT, however with specialized receivers and algorithms, they may be leveraged opportunistically for PNT. While signals of opportunity have many attractive attributes for PNT, they also have many challenges that must be addressed:

The signal availability (energy at receiving antenna) and transmitter-to-receiver geometry is insufficient for reliable PNT at all locations on Earth from any one signal type at any given time. Signal type is defined as the signals modulation type and center frequency. This is due to a number of potential issues such as but not limited to, cellular signals are not available over the ocean; cellular signals may not be trusted over other nations; television signals are not available over the ocean; television signals may not be trusted over other nations; television signal transmitter tend to be collocated; Iridium satellite signals are only received by one or two satellites at any given time; Orbcomm satellite signals are unavailable for some times and only available by one or two satellites max at any given time; Globalstar satellite signals are unavailable for some times and only available by one or two satellites max at any given time; Starlink satellites have narrow transmission beams, limiting signal reception from many satellites at any given time.

The present invention is uniquely positioned to address these above challenges and provide an SOP-based PNT solution. This invention solves the above problems via a specialized analog radio front end (RFE) board that samples each signal simultaneously followed by a set of special digital signal processing (DSP) algorithms assigned to each signal type that are implemented in hardware. The present invention has recently demonstrated increased accuracy using real cellular and LEO satellite SOPs in GPS-denial. The present invention's approach is to extract PNT measurements from a variety of terrestrial and LEO satellite SOPs from equipped devices on personnel, vehicles, stations, or the like. The mobile solution is easily mountable to vehicles and personnel (such as a handheld device or placed in a backpack). Is manageable by an average size adult based on size and weight. The same SOPs may be collected from deployed ground stations. The supplementary ground station solution is rugged and can be carried and deployed easily. The extracted SOP measurements may be used in a standalone fashion to produce a PNT solution or be fed to post-processing software to remove clock, atmospheric, and other error sources (similar to GPS RTK approaches). This post-processing software will use a special centralized PNT smoothing filter that the present invention uses (originally for GPS-based PNT). The software is capable of being extended to work with SOP PNT measurements.

Several advantages of the present invention include a lightweight and battery-powered solution that can be carried by an average sized adult. Is easily equipped to Army tactical vehicles (such as tanks, Strykers, etc.). Provides PNT measurements to personnel in valleys via LEO satellite signals (unlike ranging beacons, which become blocked by the Earth). Easy to set up ground stations which are battery-powered and self-contained (they do not transmit signals, therefore will not interfere with military signals). In some embodiments, the present invention involves the pre-deployment of ground stations and post-processing for increased accuracy with the PNT measurements. The system may be used for PNT in GPS-denial for military deployments in real time (without post processing) without the ground stations with slight performance degradation, which can be improved with the use of the ground stations (using real time SOP data sharing between the vehicle/personnel mounted device and the ground stations).

Using multiple signal types simultaneously to improve signal availability and geometry requires equipment that can coherently receive signals at different center frequencies and bandwidths, which are sometimes separated by 1000's of MHz. One known solution is to either use multiple synchronized universal software radio peripherals (USRPs) or a single multi-channel USRP that can simultaneously sample at different center frequencies; however, the size, weight, power, and cost of this solution limits it to research studies and prohibits it from being deployed for any practical handheld or vehicle application. However, these signals were not intended for PNT; therefore, digital processing techniques must be combined to form new algorithms for each signal type to reliably extract PNT information. Specifically, the information desired is the carrier and/or code phase and/or the frequency (Doppler shift) of the signal. To extract this information are algorithms targeted for software implementation, typically implemented in MATLAB or C++; however, running them requires powerful and bulky computers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a solid state drive (SSD), a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

Figure 2:
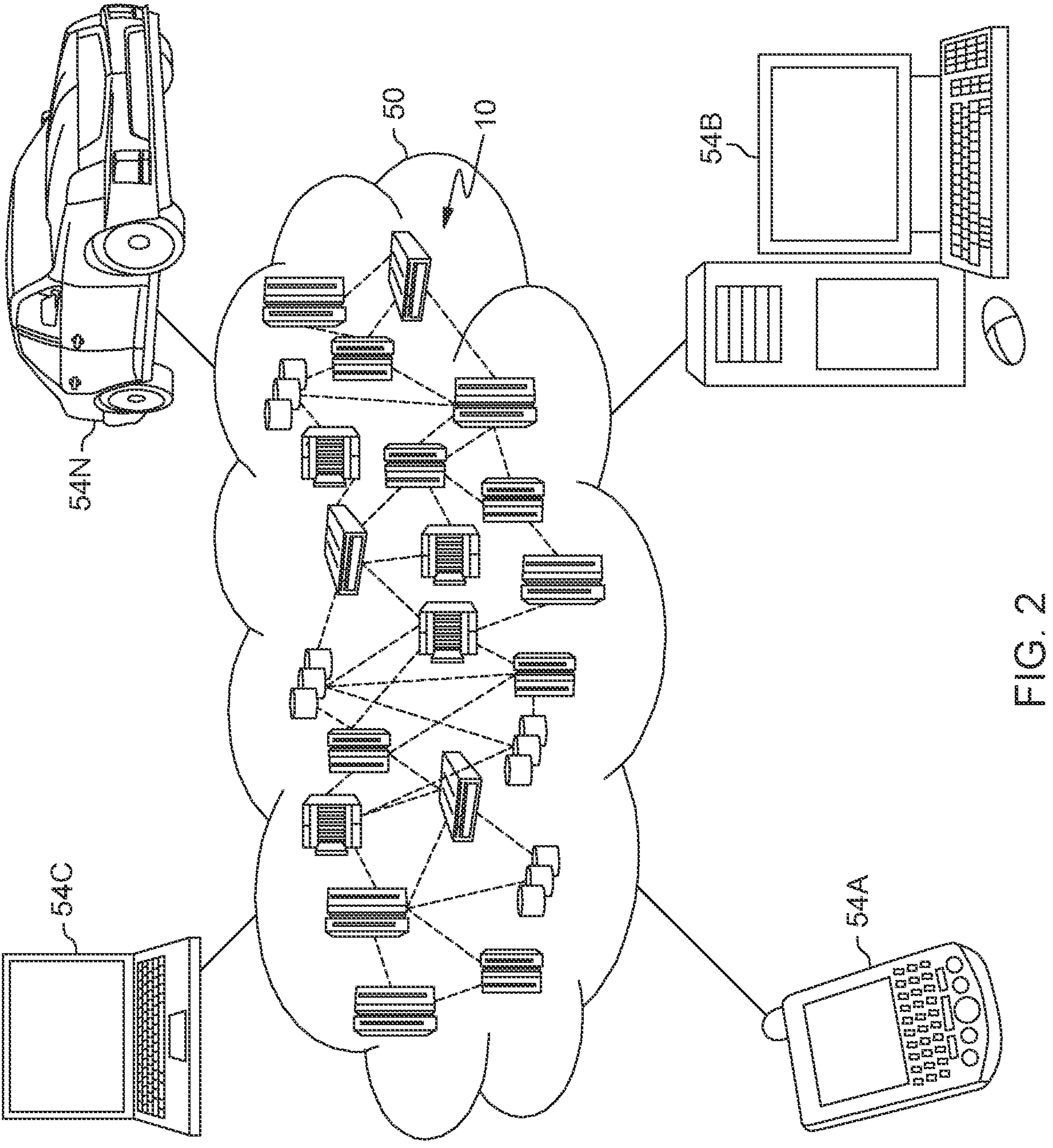
FIG. 2 depicts a cloud computing environment, according to an embodiment of the present invention.

Referring now to FIG. 2, illustrative cloud computing environment 50 is depicted. As shown, cloud computing environment 50 comprises one or more computing nodes 10 with which local computing devices used by cloud consumers, such as, for example, personal digital assistant (PDA) or cellular telephone 54A, desktop computer 54B, and laptop computer 54C may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C shown in FIG. 2 are intended to be illustrative only and that computing nodes 10 and cloud computing environment 50 can communicate with any type of computerized device over any type of network and/or network addressable connection (e.g., using a web browser).

Referring back to FIG. 1, the Program/utility 40 may include one or more program modules 42 that generally carry out the functions and/or methodologies of embodiments of the invention as described herein.

Figure 3:
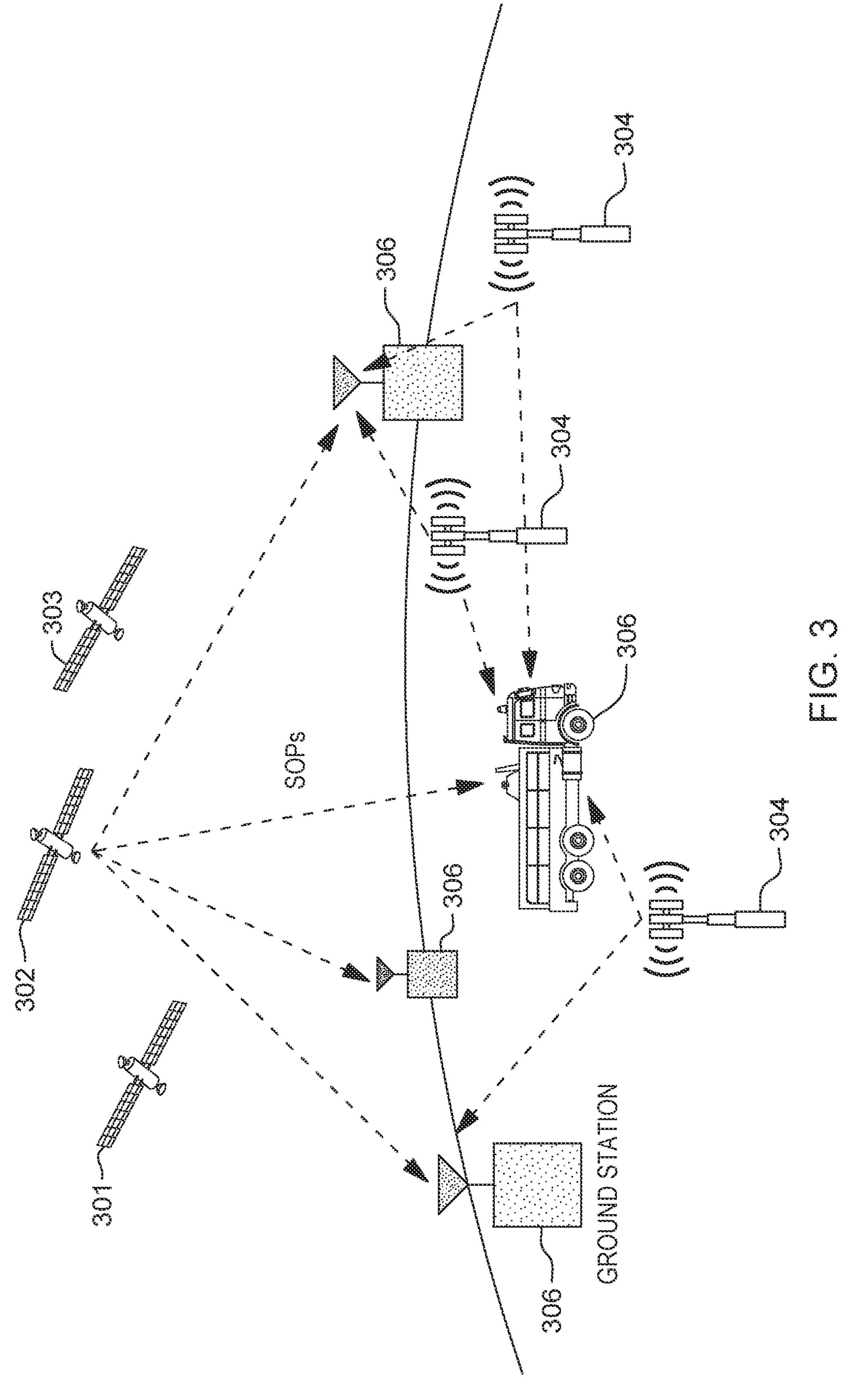
FIG. 3 depicts a block diagram depicting an environment, according to an embodiment of the present invention.

FIG. 3 depicts a block diagram of a system, in accordance with one embodiment of the present invention. In the present embodiment, the system is comprised of ground stations 306, ground based vehicle (or personnel) 306, various satellites 301, 302, and 305 and ground-based transmitters 303, and 304, wherein the various satellites and ground-based transmitters are able to transmit the SOPs.

The vehicle, personnel, or ground station 306 is mounted with the device that is able to extract and save PNT measurements from the SOPs, inertial measurement unit (IMU), magnetometer, and barometer and calculate a location of the vehicle, personnel, or ground station 306. The ground stations 306 that are deployed to collect measurements from the SOP transmitters. These ground stations 306 in some embodiments, do not transmit any signals, they only record SOP measurements. One of their purposes is to improve estimation performance of SOP transmitter locations, clock errors, and other atmospheric errors.

A computing device (not shown) performs the processing to identify the "ground-truth" PNT solutions by combining all of the data collected by the SOP transmitters, IMU, other sensors or data collecting devices, as well as the ground stations 306 and vehicle/personnel mounted devices through processing the collected data. The computing device may be connected through a network or through a hardwired connection. This approach effectively makes the system a collaborative network of nodes estimating a common state vector consisting of the vehicle/personnel 306 positions. Therefore, this system exploits the well-known benefits of collaboration: teamwork effect, anchor effect, and reset effect.

The accuracy of a PNT solution that is produced using pseudorange, Doppler, and/or carrier phase measurements drawn from the SOP transmitters 301, 302, 303, 304, 305 signals mainly depend on: number of transmitters, transmitter-receiver geometry, measurement quality, and maneuvers of trajectory to be estimated. Each transmitter, and their geometry will be evaluated via a terrestrial tower and a satellite survey. In some embodiments, the geometric dilution of precision (GDOP) is computed for each location of interest to determine the best transmitters to use in the PNT filter. In one embodiment, a cellular tower 303 and/or 304 position pre-survey may be performed for the location of interest in order to preload the tower positions into the system. The measurement quality of each viable signal is characterized by deriving measurement noise characteristics from the received signal. In some embodiments, simulations are performed using the determined transmitter-receiver geometry and measurement quality for various personnel/vehicle maneuvers.

The computing device uses an integrated navigation system that can operate in one of two modes: 1) Real-time, which runs an estimator online to produce a PNT solution; 2) Sensor data recorder, which timestamps and stores data for use in post-processing. The sensor data recorded consists of a GPS, IMU, barometer, magnetometer, and other sensors or data collection modules. This system provides the benefit of being able to timestamp and store SOP measurements along with the other sensor data during GPS-denial. The computing device is able to process the cellular code division multiple access (CDMA), Orbcomm low Earth Orbit, Long-Term Evolution (LTE), and other ambient signals, into PNT information using software-defined radios (SDRs). Resulting measurement noise standard deviations for different SDR architectures will be examined. In some embodiments, the lowest standard deviation architectures will be selected.

In one embodiment, the computing device incorporates post-processing software designed to produce a "ground truth" trajectory using SOP collected data and the other recorded sensor data. In some embodiments, this "ground truth" level of accuracy is within centimeters of the objects real location(s).

Typically, in this type of calculation, a variety of real-world conditions adversely affect GPS receiver performance, e.g., tall buildings and trees, thereby producing nulls (GPS denied) and measurement outliers. The computing device is able to achieve the high-level accuracy when GPS is available. In some embodiments, where GPS is unavailable, the level accuracy is slightly decreased, but is achieved using the SOP signals instead of GPS signals.

The computing device uses both terrestrial stationary SOP transmitters 303, 304 as well as satellite 301, 302, 305 transmitted SOPs for PNT. To use SOPs for PNT the positions of the transmitters must be determined. In some embodiments, the positions of SOP towers are preloaded using mapping tools or estimated online with or without additional deployed ground stations. The present invention generates LEO satellite trajectories using either: 1) a simplified perturbation model using Mean Keplerian information stored in NORAD two-line element (TLE) files, 2) a sophisticated satellite dynamics model, 3) joint estimation using the ground stations and other SOP receivers equipped on other vehicles that are also receiving their signals, 4) decoding satellite ephemeris information transmitted in their broadcast signals, or 5) a combination of these methods. The terrestrial tower data and the LEO satellite SOP data will be fused with their signals to estimate the locations of the receivers that are receiving their signals.

The computing device is able to use the software and collection of data from the various sources to generate realistic vehicle and dismounted personnel trajectories and corresponding IMU, barometer, and SOP pseudorange/Doppler measurements. The optimal ground station configuration will be determined to minimize the geometric dilution of precision. These measurements will be fused through a PNT filter to estimate the "true" trajectories for vehicles and dismounted personnel. Each vehicle and dismounted personnel will be located fusing data from the IMU, barometer, magnetometer, and a specialized SOP receivers that generate pseudoranges, Doppler, and carrier phase measurements to all available SOPs in their vicinity. Together, the vehicles 306, personnel 306, and ground stations 306 form a community of cooperating nodes that will use a centralized-equivalent state-estimator to estimate the PNT of each vehicle and dismounted personnel. The ground station locations will be known by using GPS before GPS-denial begins. Static errors (e.g., sensor biases) and Stochastic errors (e.g., sensor bias instability and white noise) will depend on the quality of the sensors and will be modeled and loaded into the system.

Measurements can be corrupted or affected by stochastic and dynamics clock errors as well as additive measurement noise, which the present invention is able to account for in the processing. In some embodiments, different parameters for the random process driving the dynamic clock error will be tested and analyzed for accuracy. In other embodiments, parameters for one or more clock types will be tested and analyzed to accuracy, the clock types may be, but not limited to TCXO, OCXO, and CSAC. For the post-processing mode, measurements made by each vehicle, dismounted personnel, ground station, and SOP will be fused through a centralized estimator. The centralized estimator will be cast as a nonlinear Maximum A Posteriori optimization problem over the entire trajectories taken by each vehicle and dismounted personnel.

The present invention uses software-define radios (SDR) to extract pseudorange and/or Doppler measurements from each of the terrestrial and LEO satellite SOPs. This is accomplished by leveraging the structure of communication signals and propagation physics of electromagnetic radio waves via a specially designed SDRs to produce pseudoranges and Doppler measurements. With enough of these measurements, which are parameterized by the geometry between transmitter and receiver (and other nuisance parameters), an estimation algorithm can be formed to solve for a receiver's position and velocity.

In some embodiments, the Code Division Multiple Access (CDMA) and Long-Term Evolution (LTE) cellular signals can be exploited for navigation. The designed SOP SDRs will extract PNT measurements from CDMA signals by tracking the code phase of the chipping sequence coming from each available CDMA base station. Furthermore, PNT measurements will be extracted from LTE signals by tracking the synchronization signals that exist in dedicated subcarriers for timing and channel estimation purposes. The acquisition and tracking of cellular CDMA signals are similar to the methods employed by GPS receivers; however, unlike GPS receivers, SOP receivers tracking CDMA and LTE signals cannot extract transmitter location information from an ephemeris message. The transmitters' positions will be estimated using SOP measurements received at the deployed ground stations.

LEO satellite downlinks are another PNT source; however, signals from different constellations (analogous to different cellular providers) are modulated using non-unified modulation schemes and exist in various frequency bands; therefore, the signal structure from different constellations is used to guide the various SOP receiver designs needed for each desired constellation. In one embodiment, the processing of the 137 MHz Orbcomm (a LEO satellite constellation) signals is done using a QPSK carrier synchronization tracking loop to extract Doppler measurements for a navigation filter. In another embodiment, the frequency and signal structure of Iridium Next satellites is used to get Doppler measurements. The navigation receiver either uses stored positions of stations SOPs or determines the location of each SOP source online in order to solve for its own state. In the post processing mode, satellite orbital elements will be estimated using LEO satellite signal measurements from the deployed ground stations.

The receiver is designed to produce PNT measurements in real-time using SWaP conscientious engineering. Therefore, an appropriate SDR architecture is selected to ensure computational demands are met without wasting an abundance of power and space. Typical SDR architectures may be based around general purpose processing (GPP), hardware based around DSP/FPGA processing, or a co-design implementation where signal processing intensive tasks are performed by an FPGA with the support of a host-computer.

Figure 4:
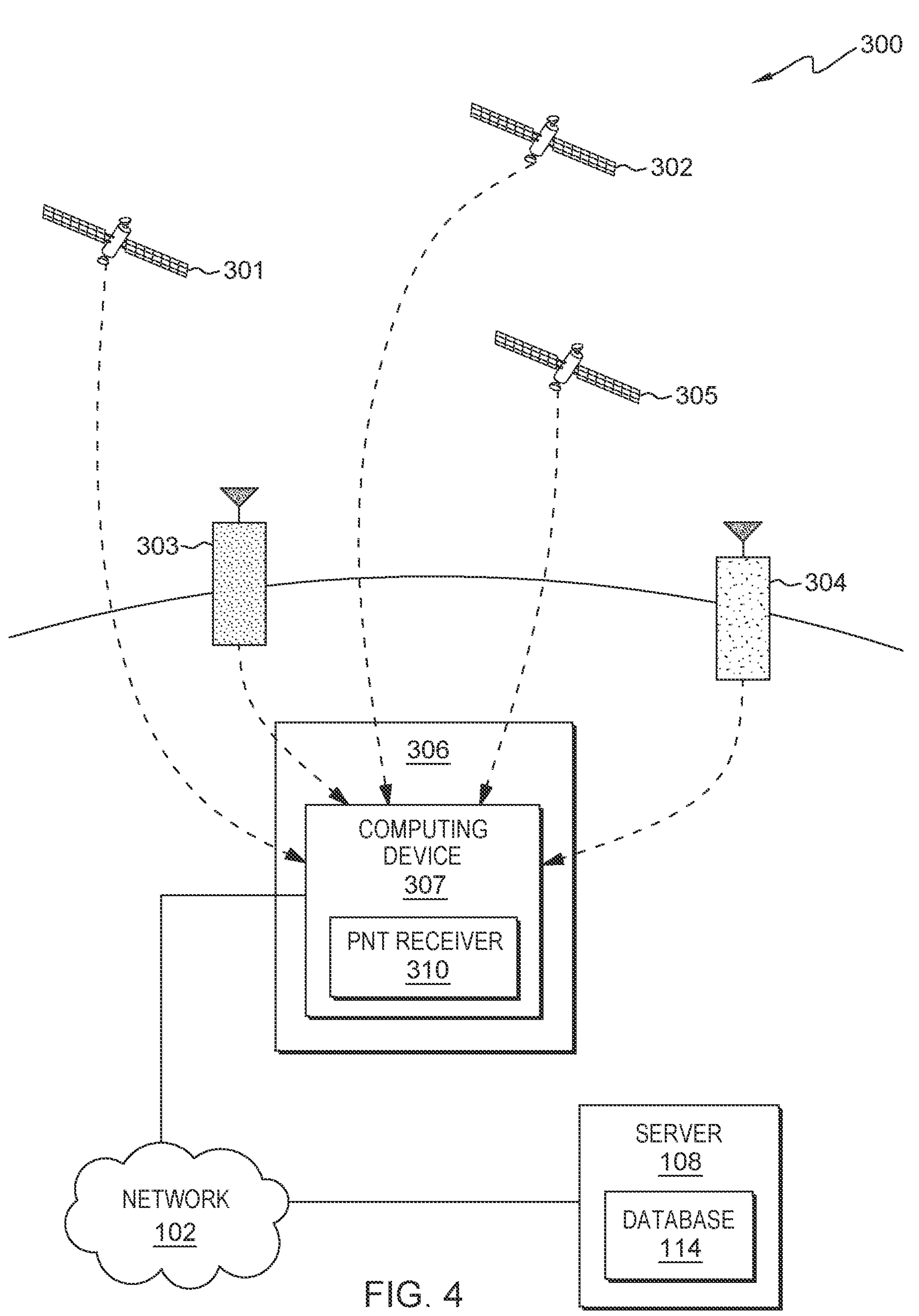
FIG. 4 depicts a block diagram depicting an environment, according to an embodiment of the present invention.
Figure 6:
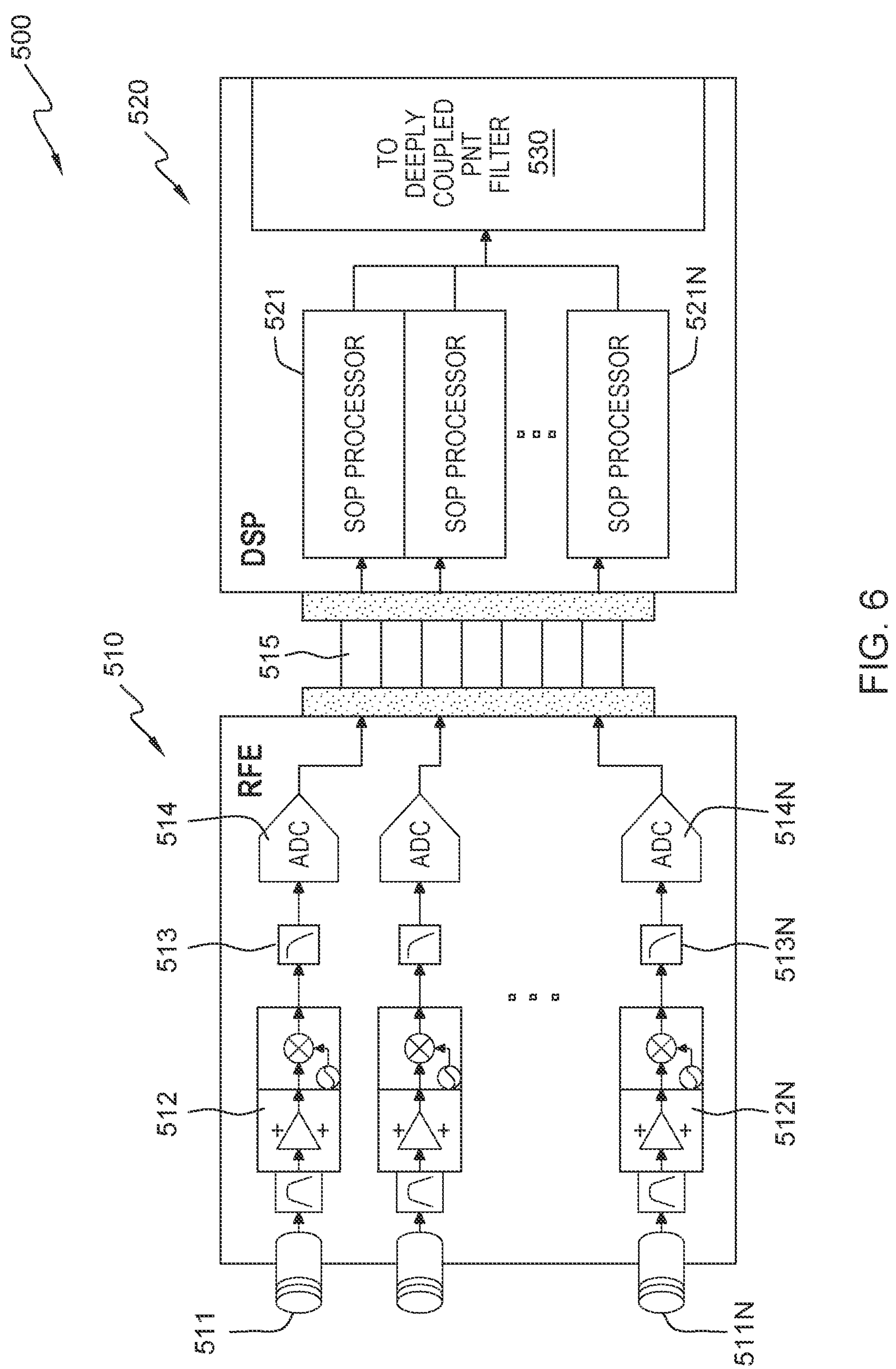
FIG. 6 depicts a block diagram of a hardware component, according to an embodiment of the present invention.

FIG. 4 depicts a block diagram depicting an environment, according to an embodiment of the present invention. FIG. 1 provides an illustration of one embodiment and does not imply any limitations regarding the environment in which different embodiments maybe implemented. In the depicted embodiment, vehicle/personnel/station 306 are equipped with the computing device 307 which includes the RFE/DPS component 310 receiver, wherein the RFE/DPS component 310 includes the analog front end (RFE) and digital signal processing (DPS) components which are shown in FIG. 6. Satellites 301, 302, and 305 are shown communicating with the computing device 307/RFE/DPS component 310 as well as ground transmitting device 303 and 304. The Computing device 307/RFE/DPS component 310 is able to communicate/connect to network 102, which is connected to server 108. In some embodiments the ground stations which communicate with the vehicle/personal 306 are connected to network 102.

Figure 9:
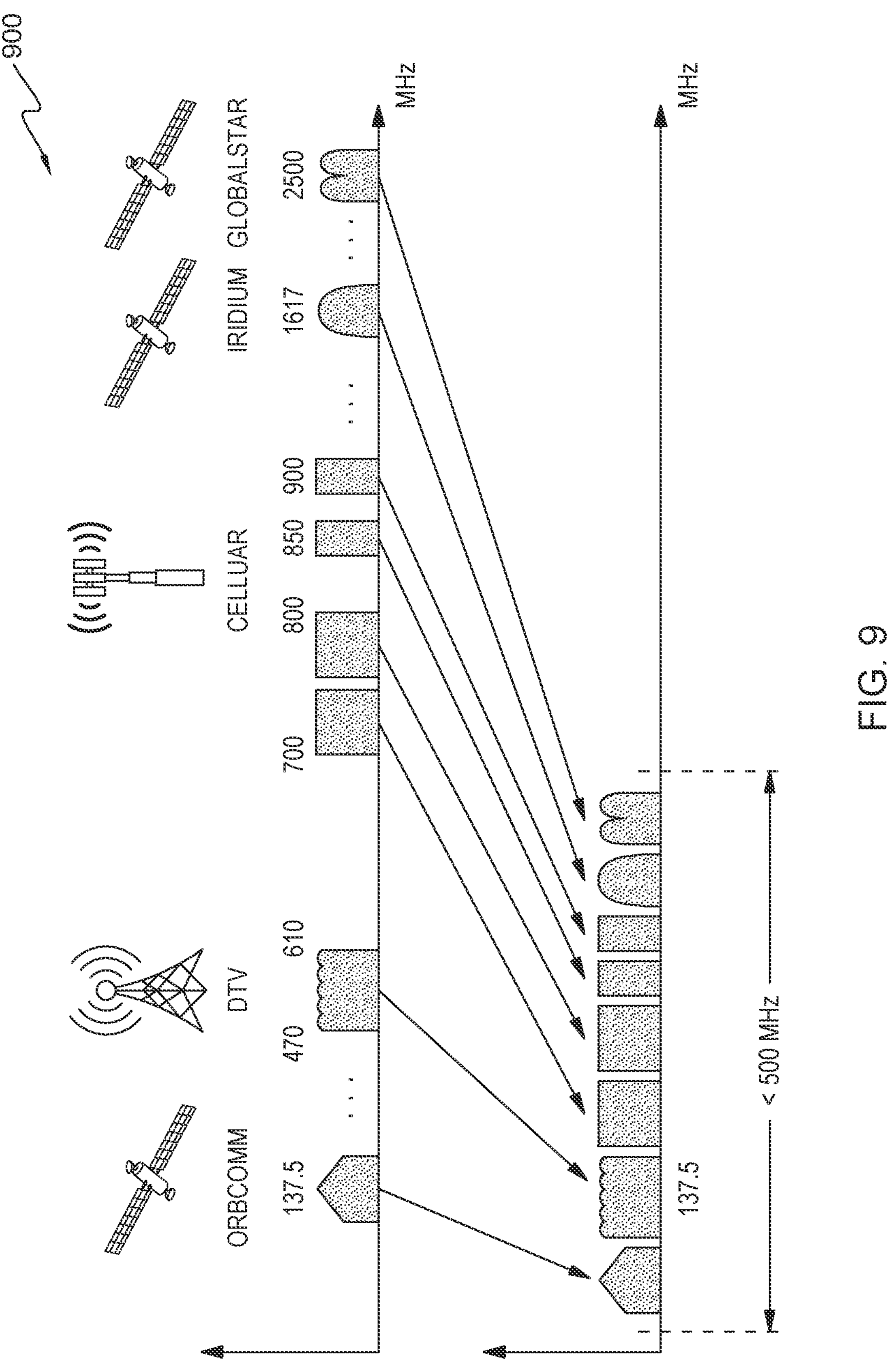
FIG. 9 depicts an illustration of the frequency of various signals, in accordance with an embodiment of the present invention.

As shown in FIG. 6, the device 500 is comprised of the two components the RFE board 510 and DPS component 520 and are used to sample each of the signals produced by the different SOPs, such as, but not limited to Orbcomm, Iridium, Iridium Next, Global star, Global Positioning Systems (GPS) L5, cellular, DTV, and the like and simultaneously mixes each one to choose an intermediate frequency (IF) using a heterodyne IF architecture. In the depicted embodiment, the RFE board 510 and the DPS component 520 are shown as two separate elements connected via 515-515N. In some embodiments, the RFE board 510 may be integrated with the DPS component 520 as a processor(s) built into the board. In other embodiments, DPS component 520 may be a separate component (built into its own circuit board) which is connected, via a connector, to the RFE board 510. As shown in FIG. 9, each signal may have a different frequency, and each signal maybe distinct from each other signal. In some embodiments, the signals may have overlapping frequencies. This allows the RFE board 510 to distinguish each SOP from one another. In the depicted embodiment (shown in FIG. 9) Orbcomm is at a frequency of approximately 127.5 MHz, DTC is at a frequency range of 470 MHz to 610 MHz, cellular is at various frequencies ranging from 700 MHz, 800 MHz, 850 MHz, to 900 MHz, Iridium is at a frequency of approximately 1617 Mz, and Globalstar is at a frequency of approximately 2500 MHz. In additional embodiments, different SOP may be present, and the SOP may have different frequency ranges as well based on the SOP design.

The RFE board 510 receives the signals from the SOPs through the antenna (e.g. SMAs) 511-511N, where each SMA is designed to receive signals within a frequency range. The depicted embodiment has SMA 511-511N to indicate that multiple signals may be received by the RFE board 510, and each signal has an independent set of components to process that signal. Internal components 512, 513, and 514 are related to the steps which are performed by those components. The pre-conditioning step 402, the mixing, filtering, and amplification step 403, and the analog to digital conversion step 404 are related to components 512, 513, and 514 respectively.

DPS component 520 is connected to RFE board 510 via connection 515, and DPS component 520 includes a series of processors 521-521N. The processors are each associated with the respective SMA, and are designed to process the received digital signal, and calculate a PNT measurement. The DPS component 520 also can include a PNT Filter 530 to further process each of the PNT measurements.

Figure 8:
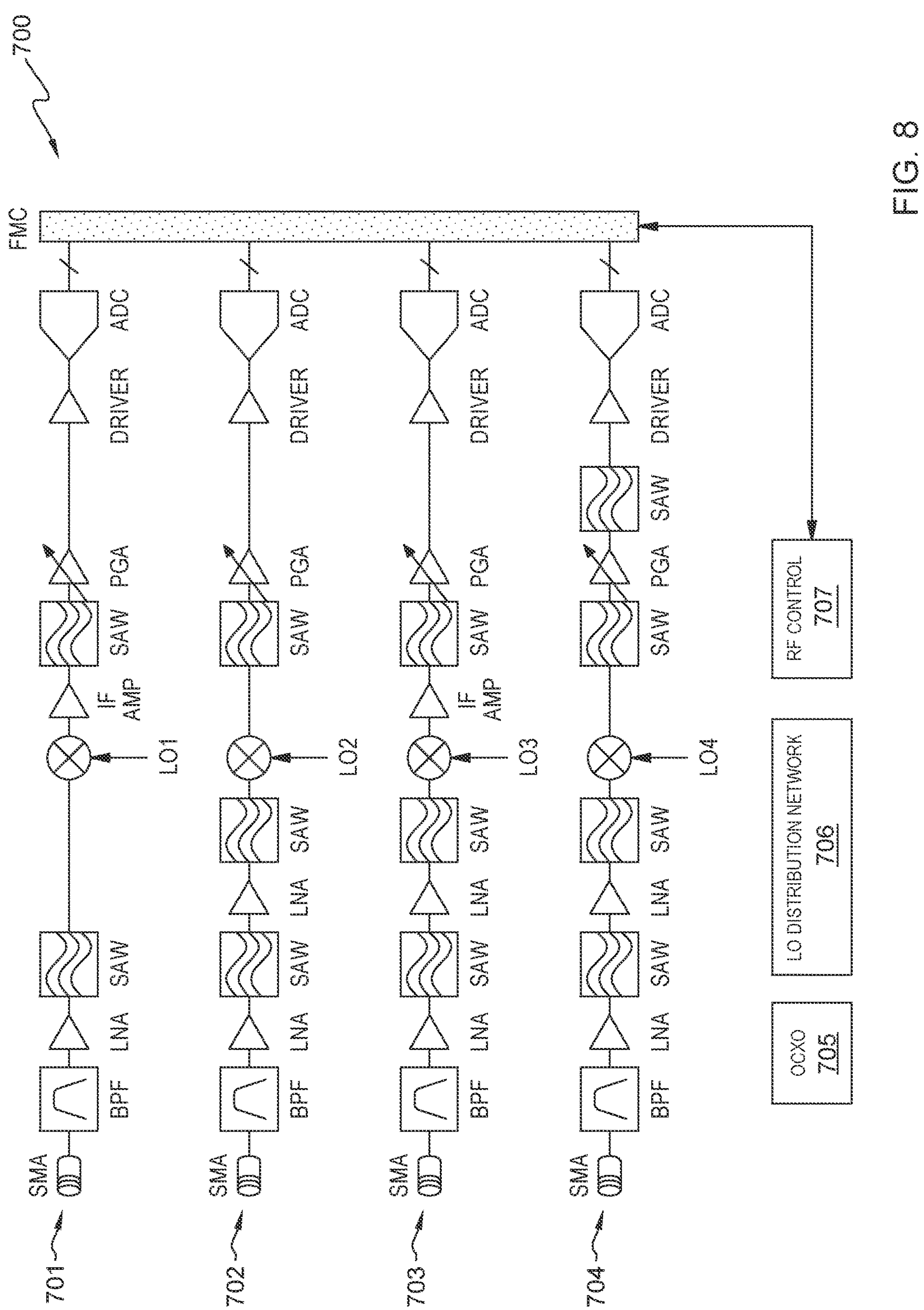
FIG. 8 depicts a block diagram of a quad channel receiver, according to an embodiment of the present invention.

As shown in FIG. 8, a detailed embodiment of the RFE board 510 is shown, where components 511, 512, 513, and 514 are extrapolated into individual components. As shown each "path" has differing components to account for the signal type, frequency, and steps required to produce the digital signal which is sent to the DPS component 520. Components such as Band Pass Filter (BPF) Low-Noise Amplifiers (LNA), Surface Acoustic Wave (SAW) filters, Local Oscillators (LO), Intermediate Frequency Amplifiers (IF AMP), Programmable Gain Amplifier (PGA), and Audio to digital converters (ADC) are some components which are used to convert the received signal to a readable digital signal by the processors 521. In the depicted embodiment, a clock 705 is incorporated into the RFE Board 510. Some examples of the clock 705 are TCXO, OCXO, and CSAC.

The clock 705 feeds the LO distribution network 706. The RF control 707 does the initialization for the tunable components of the system 700.

Figure 7:
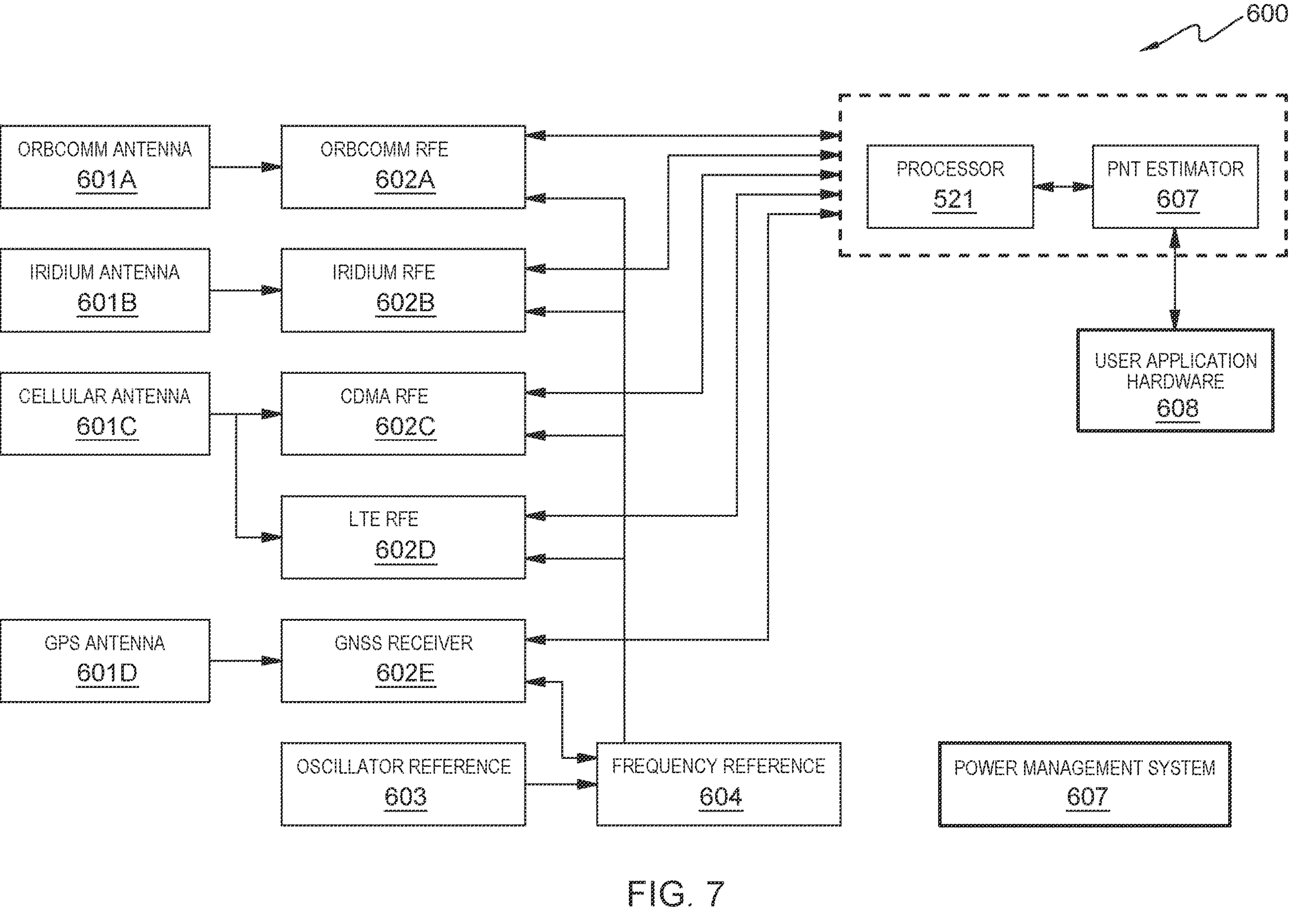
FIG. 7 depicts a block diagram of a hardware component, according to another embodiment of the present invention.

The RFE board 510 achieves the processing of the signal through three steps, the pre-conditioning step 402, the mixing, filtering, and amplification step 403, and the analog to digital conversion step 404. As shown in FIG. 7, "paths" 701, 702, 703, and 704 are shown with differing components, the present example of steps 402, 403, and 404 are related to path 701, it should be noted that this process will differ based on the components within the path and may differ from what is described below. The pre-conditioning step comprises receiving of the signal and processes through a BPA to remove all frequencies outside of a certain range. The signal is then processed through an LNA, then through a SAW filter, through another LNA, and a second SAW filter. The pre-conditioning step 402, this step is specially design for each signal type to filter relatively high-power out-of-band signals and reduce the image response. In one embodiment, the noise value for each channel is less than 3.6 dB. This value can be reduced by swapping the order of the LNA and BPF; however, the risk of allowing strong out-of-band signals to cause non-linearities early in the RF path is undesirable. Thus, low insertion loss bandpass filters are placed first to reduce the risk of nearby transmitters distorting the signals in the sensitive receiver paths.

The mixing, filtering, and amplification step 403 takes the signal from a SAW filter and uses a LO to change the frequency of the signal. As shown in FIG. 9, as an illustration, each of the signals ranging from 137.5 to 2500 are adjusted to fit within a 500 MHz band. This frequency conversion process (heterodyning) produces the sum and difference frequencies from the frequency of the LO and frequency of the input signal. An intermediate frequency amplifier is then used to adjust the signal, and an SAW filter is used. The Mixing, Filtering, and Amplification step 403, mixes the signal to a strategically selected IF, placing each signal type into a specific Nyquist zone. The specific Nyquist zones are chosen based off commercially available SAW filters. The advantage of these SAW filters is that the SAW filter offers a sharp cutoffs at high center frequencies (high-Q) which make them advantageous for undersampling applications. Specifically, the mixers contain integrated synthesizers allowing them to be digitally tuned to support many modern frequency bands. This allows a common reference clock, such as a 10 MHz signal, to feed the different mixers of each channel. The use of programmable gain amplifiers allows for adjusting the power delivered into the ADC in a potentially contested environment.

The final step within the RFE board 510 is the analog to digital conversion step 404, which uses a PGA in conjunction with a driver to produce the signal which is then processed by the ADC. In one embodiment, the ADCs selected have around 78-88 dBFS of spurious free dynamic range (SFDR) and 65-73 dB of signal-to-noise ratio (SNR). Thus, biasing the ADC to use a full-scale of 10 dBm and asserting that the power into the ADC should never approach 10 dB of full scale, then our signal power into the ADC should be from −60 to 0 dBm. A power gain of 70 dB is adequate to sample the desired bands without saturating the ADC with thermal noise and leaves headroom for in-band blockers weaker than −70 dBm.

The RFE board 510 leverages undersampling to capture the desired signals to alleviate the requirements of image filters at the RF frequency. Many modern ADCs have analog passbands that support sampling of higher Nyquist zones. This RFE board 510 incorporates proper band-pass anti-aliasing filters to prevent unwanted signals from corrupting the sampling process.

Network 102 may be a local area network (LAN), a wide area network (WAN) such as the Internet, any combination thereof, or any combination of connections and protocols that can support communications between computing device 104, and server 108 in accordance with embodiments of the invention. Network 102 may include wired, wireless, or fiber optic connections.

Computing device 307 may be a management server, a web server, or any other electronic device or computing system capable of processing program instructions and receiving and sending data. In some embodiments, computing device 307 may be a laptop computer, tablet computer, netbook computer, personal computer (PC), a desktop computer, or any programmable electronic device capable of communicating with personnel computing device 106 and server 108 via network 102. In other embodiments, computing device 307 may represent a server computing system utilizing multiple computers as a server system, such as in a cloud computing environment. In another embodiment, computing device 307 represents a computing system utilizing clustered computers and components to act as a single pool of seamless resources. In the depicted embodiment, computing device 307 includes the RFE/DPS component 310. Computing device 307 may include components, as depicted and described in further detail with respect to FIG. 1.

Server 108 may be a management server, a web server, or any other electronic device or computing system capable of processing program instructions and receiving and sending data. In other embodiments server 108 may be a laptop computer, tablet computer, netbook computer, personal computer (PC), a desktop computer, or any programmable electronic device capable of communicating via network 102. In one embodiment, server 108 may be a server computing system utilizing multiple computers as a server system, such as in a cloud computing environment. In one embodiment, server 108 represents a computing system utilizing clustered computers and components to act as a single pool of seamless resources. In the depicted embodiment database 114 is located on server 108. Server 108 may include components, as depicted and described in further detail with respect to FIG. 1.

Database 114 may be a repository that may be written to and/or read by the RFE/DPS component 310. Information and data created from the processor(s) may be stored to database 114. Such information may include signal data, frequency reference data, processed signal data, estimator data, and the like. In one embodiment, database 114 is a database management system (DBMS) used to allow the definition, creation, querying, update, and administration of a database(s). In the depicted embodiment, database 114 resides on patient computing device 104. In other embodiments, database 114 resides on another server, or another computing device, provided that database 114 is accessible to RFE/DSP component 310.

Figure 5:
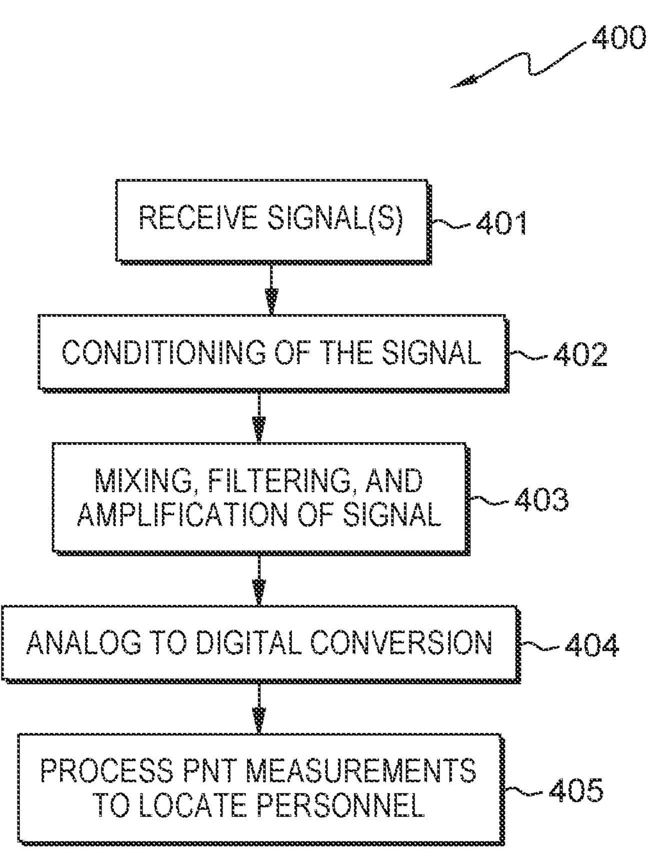
FIG. 5 depicts a flowchart of the operational steps taken by a program to receive and process multiple signals simultaneously to improve signal availability within the computing environment of FIG. 1 according to an embodiment of the present invention.
Figure 10:
FIG. 10 depicts an illustration of the frequency of various signals, in accordance with an embodiment of the present invention.
Figure 10:
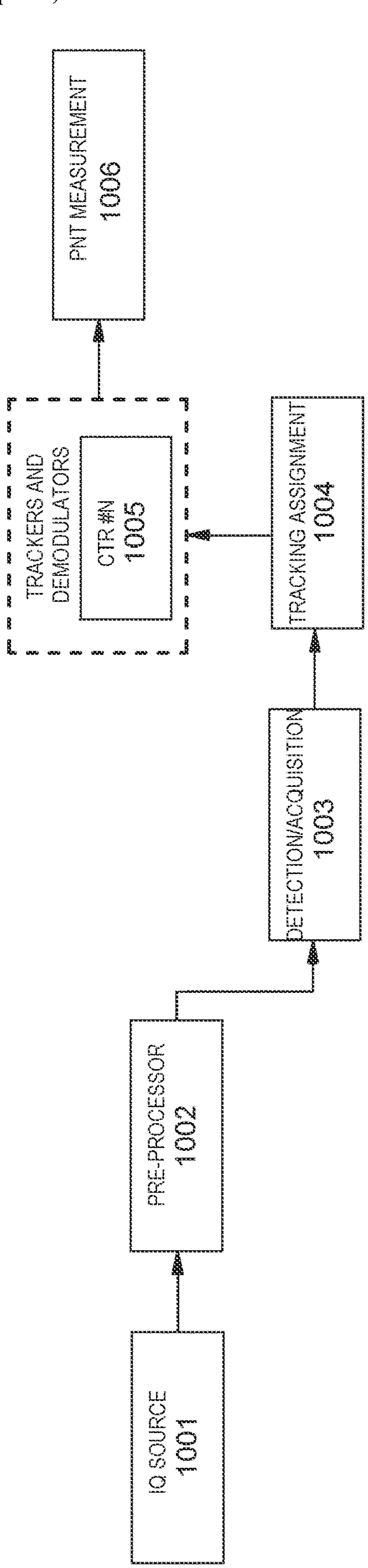

FIG. 5 depicts a flowchart of the operational steps taken to receive and process multiple signals simultaneously to improve signal processing within the computing environment of FIG. 1 according to an embodiment of the present invention. Signals from the various sources are received into the system over RF connectors, such as SMA, MCX, U.FL, etc. (step 401). Conditioning of each signal (step 402) is performed to filter high-power out-of-band signals and reduce the image response. Mixing, filtering, and amplification (step 403) is then performed to modify the signal into a format compatible with the sampling process; mixing translates the RF signals to an intermediate frequency (IF), filtering reduces the bandwidth to a single Nyquist zone, and amplification increases the amplitude of the weak signals. Once the IF is created for each SOP, the analog signal is converted to digital (Step 404) and provided to the processor (s). The processor(s) analyzes the digital signal and calculates the PNT measurements through a series of algorithms that convert the digital signal to the PNT measurements. These algorithms are signal type specific and vary from one SOP to the next (step 405). These algorithms are signal type specific and vary from one SOP to the next (step 405). As depicted in FIG. 10, the algorithms include the following steps. A pre-processor 1002 to accomplish buffering and digital down-conversion of the received IQ source 1001 or the digitalized signal, the signal detection and acquisition step 1003 determines signal availability and parameters of the signal, and tracking 1004 and broadcast decoding of the signal to generate the PNT measurements 1006. The trackers and demodulators 1005 keep the frequency and phase log with the reference signal, to provide replicate properties of that specific signal when processing. In some embodiments there are multiple trackers and demodulators based on the number of received signals and the number of reference signals. The PNT measurement may be performed from the real time data which is collected by the hardware from the various SOPs, or may be measured from post-processing via memory transfer. The PNT measurements from each received SOP is used to calculate a final PNT measurement for the vehicle or personnel. This may be the selection of one of the PNT measurements, or may be an averaging of the many PNT measurements which are calculated.

FIG. 7 depicts a block diagram of an RFE/DSP component 600, according to another embodiment of the present invention. The RFE/DSP component 600 is shown having the various antenna 601A-60D which are associated with a predetermined signal type (e.g., Orbcomm, Iridium, Cellular, and GPS). These antennae are connected to the corresponding RFE/DPS 602A, 602B, 602C, 602D, and 602E. In the depicted embodiment, the cellular signal is split into a CDMA and LTE signal types. Each signal type has varying internal components within the RFE/DPS. A frequency reference 604 is connected to each RFE/DPS as well as an oscillator reference 603 to assist in the adjustment of the signal to be sent to the processors 521. The RFE/DSP component 600 is also able to receive oscillator references 603 and incorporate this data with a frequency reference 604, which is able to communicate with the various receivers and the RFE or DSP components. Each of the RFE/DSP are connected to a single processor 521, which is able to process each signal. The RFE/DSP component 600 has an PNT estimator 607, which is able to perform the calculations above and provide this information to a piece of hardware for the user to interact with. This data can be sent to a user application hardware 608. The user application hardware is a third party software which provides a visual image of the location of the PNT measurement or may provide additional information related to the PNT measurement such as directions to, or the like. In the depicted embodiment a GNSS Receiver 602D is also integrated into the computing device to receive data from a GPS antenna 601D. In the depicted embodiment, the RFE/DSP component 600 has an internal power management system 608, which provides the necessary power for the RFE/DSP component 600 to work remote.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A PNT sensor comprising:

at least one antenna, wherein each of the at least one antenna receive an independent analog signal;

at least one electronic frequency conversion module connected to each of the at least one antenna, and configured to receive at least one analog signal and performs heterodyning on the at least one analog signals and convert the at least one analog signal to a digital format, wherein conversion process filters a predetermined band of analog signals and reduces image response of the at least one analog signal, wherein the at least one electronic frequency conversion module is comprised of, base on the received independent analog signal:

at least one band pass filter connected to each of the at least one antenna, at least one low noise amplifier connected to each of the at least one band pass filter, at least one surface acoustic wave filter connected to each of the at least one low noise amplifier, at least one oscillator, at least one programable gain amplifier, at least one driver, at least one analog to digital converter connected to the at least one driver, and at least one clock connected to the at least one electronic frequency conversion module;

a processing unit connected to the electronic frequency conversion module and connected to an external display device;

a PNT estimator connected to the processing unit and the external display device, wherein the PNT estimator calculates a position and provides a visual of the calculated position to the external display device; and an independent power source connected to the at least one electronic frequency conversion module and the processing unit.

2. The PNT sensor of claim 1, wherein the at least one electronic frequency conversion module and the processor are integrated into independent circuit boards which are electrically and mechanically connected.

3. The PNT sensor of claim 1, further comprising a frequency reference component which is in communication with the at least one electronic frequency conversion module.

4. The PNT sensor of claim 1, wherein a plurality of processing units are integrated into the PNT sensor and the at least one electronic frequency conversion modules are each connected to a different processing unit.

5. The PNT sensor of claim 1, wherein the at least one electronic frequency conversion module performs heterodyning on the at least one analog signals.

6. The PNT sensor of claim 5, wherein the at least one electronic frequency conversion module selects an intermediate frequency within a specific Nyquist zone based on a predetermined set of received parameters based on at least one SAW filters and.

7. The PNT sensor of claim 1, further comprising a PNT filter connected to the processing unit.

8. The PNT sensor of claim 1, further comprising at least one demodulator connected to the processing unit.

9. The PNT sensor of claim 1, wherein the at least one electronic frequency conversion module, further comprises, at least one an intermediate frequency amplifier.

10. A PNT sensor comprising:

at least one antenna wherein each of the at least one antenna receives a frequency within a predetermined range;

at least one electronic frequency conversion module connected to each of the at least one antenna, wherein each of the at least one electronic frequency conversion modules are able to receive different signals from each of the at least one antenna and simultaneously process each of the different signals, wherein the at least one electronic frequency conversion module is comprised of:

at least one band pass filter, at least one low noise amplifier connected to the at least one band pass filter, at least one surface acoustic wave filter, at least one oscillator, at least one programable gain amplifier, at least one driver, and at least one analog to digital converter connected to the at least one driver;

at least one radio frequency receiver, connected to one of the at least one antenna, wherein each of the at least one radio frequency based on the frequency received by the connected at least one antenna are comprised of at least one of a band pass filter, a low noise amplifier, an oscillator, a surface acoustic wave filter, a local oscillator, an intermediate frequency amplifier, a programable gain amplifier, a driver, an analog to digital converter;

at least one digital signal processing unit connected to the at least one radio frequency receivers;

a PNT filter connected to the at least one digital signal processing unit;

an independent power source integrated into the digital signal processing unit; and a PNT estimator connected to the at least one digital signal processing unit, wherein the PNT estimator generates a data set which is provided to a user device to present viewable location data on the user device.

11. The PNT sensor of claim 10, further comprising, a frequency reference connected to the at least one radio frequency receivers.

12. The PNT sensor of claim 11, further comprising, an oscillator reference connected to the frequency reference.

13. The PNT sensor of claim 10, further comprising, at least one clock connected to the at least one electronic frequency conversion module.

14. The PNT sensor of claim 10, wherein the at least one electronic frequency conversion module, further comprising, at least one an intermediate frequency amplifier.

15. A PNT sensor comprising:

at least one antenna, wherein each of the at least one antenna receive an independent analog signal;

at least one electronic frequency conversion module connected to each of the at least one antenna, and configured to receive at least one analog signal and convert the at least one analog signal to a digital format, wherein the conversion process filters a predetermined band of each of the independent analog signals simultaneously;

a frequency reference module able to communicate with the at least one electronic frequency conversion modules;

a processing unit connected to the electronic frequency conversion module, wherein the processing unit is able to calculate position data from the converted digital signals;

an external display device connected to the processing unit; and an independent power source connected to the at least one electronic frequency conversion module and the processing unit.

* * * * *